United States Patent

Moyer

(10) Patent No.: US 8,533,400 B2
(45) Date of Patent: Sep. 10, 2013

(54) SELECTIVE MEMORY ACCESS TO DIFFERENT LOCAL MEMORY PORTS AND METHOD THEREOF

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 365 days.

(21) Appl. No.: 13/016,371

(22) Filed: Jan. 28, 2011

(65) Prior Publication Data

US 2012/0198177 A1     Aug. 2, 2012

(51) Int. Cl.
     *G06F 13/00*     (2006.01)
(52) U.S. Cl.
     USPC .............................. 711/140; 711/125; 711/144
(58) Field of Classification Search
     USPC ............................................ 711/125, 140, 144
     See application file for complete search history.

(56) References Cited

U.S. PATENT DOCUMENTS

| 5,410,669 A | 4/1995 | Biggs et al. |
| 5,532,947 A | 7/1996 | Potter et al. |
| 6,115,792 A | 9/2000 | Tran |
| 6,438,671 B1 * | 8/2002 | Doing et al. ................... 711/173 |
| 6,484,237 B1 | 11/2002 | Agarwala et al. |
| 6,941,421 B2 | 9/2005 | Luick |
| 6,976,126 B2 | 12/2005 | Clegg et al. |
| 7,437,535 B1 | 10/2008 | Joffe et al. |
| 7,529,889 B2 | 5/2009 | Vasekin et al. |
| 7,548,483 B2 | 6/2009 | Cullum et al. |
| 2005/0091476 A1 * | 4/2005 | Doing et al. ................... 712/227 |
| 2007/0150671 A1 | 6/2007 | Kurland |
| 2010/0106872 A1 | 4/2010 | Moyer et al. |
| 2010/0107243 A1 | 4/2010 | Moyer et al. |
| 2012/0198156 A1 | 8/2012 | Moyer |
| 2012/0290806 A1 | 11/2012 | Moyer |

* cited by examiner

*Primary Examiner* — Reba I Elmore

(57) ABSTRACT

A data processor is disclosed that definitively determines an effective address being calculated and decoded will be associated with an address range that includes a memory local to a data processor unit, and will disable a cache access based upon a comparison between a portion of a base address and a corresponding portion of an effective address input operand. Access to the local memory can be accomplished through a first port of the local memory when it is definitively determined that the effective address will be associated with an address range. Access to the local memory cannot be accomplished through the first port of the local memory when it is not definitively determined that the effective address will be associated with the address range.

20 Claims, 8 Drawing Sheets

US 8,533,400 B2

SELECTIVE MEMORY ACCESS TO DIFFERENT LOCAL MEMORY PORTS AND METHOD THEREOF

CROSS-REFERENCE TO RELATED APPLICATION

The present application is related to co-pending U.S. patent application Ser. No. 13/016,327, entitled "Selective Cache Access Control Apparatus and Method Thereof," filed on Jan. 28, 2011, the entirety of which is incorporated by reference herein.

BACKGROUND

1. Field of the Disclosure

The present disclosure relates generally to electronic devices, and more particularly, to data processor devices.

2. Description of the Related Art

Data processor units generally include an instruction execution pipeline that includes various stages that control execution of a current instruction. One stage of the pipeline provides information derived from the current instruction to a load/store unit that accesses a data operand to be used by the instruction based upon the derived information. The derived information is referred to herein as "effective address input operands" because the derived information is used by the load/store unit during an access set-up cycle to calculate an effective address of the instruction operand.

Given sufficient time during the access set-up cycle, the load/store unit will definitively determine the memory where the instruction operand is stored, and will generate an access request that only accesses that memory. However, due to tight timing constraints on the access set-up cycle, it may not be possible during the access set-up cycle to definitively determine which memory stores the instruction operand and generate an access request to access just that memory. Various ways of accommodating this situation include: delaying the generation of an access request by a clock cycle to provide additional access set-up time; generating multiple access requests that are speculative to ensure the instruction operand will be accessed during the access cycle; and generating a single access request that is speculative, and therefore may not be able to access the instruction operand from the target device. Delaying the access request by adding a clock cycle or providing a single access request that is speculative reduces performance of a data processor. Speculatively initiating multiple access requests maintains performance but consumes additional power.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A data processor unit is disclosed that can definitively determine for current instructions meeting a certain criterion whether an effective address of an instruction operand being accessed is in a predetermined address range of local address space that includes a local memory of the data processor unit. The definitive determination is completed sufficiently fast to prevent generating a speculative cache access request. When it is not definitively determined that the effective address of the instruction operand is in the predetermined address range, a speculative data cache access is initiated.

In accordance with a specific embodiment, whether the effective address is in the predetermined address range of local address space is determined by comparing a portion of a base address value of the local memory to a corresponding portion of an effective address input operand. This comparison is done in parallel with a data path that calculates the effective address of the instruction operand based on the effective address input operand and generates the access requests. Being able to prevent un-needed cache accesses for those instructions that meet the predetermined criterion can reduce power consumption. Such a feature can be used by programmers and compilers to facilitate use of instructions that meet this particular criterion. A particular embodiment of the effective address decode scheme is described with reference to FIGS. 1-10.

Figure 1:
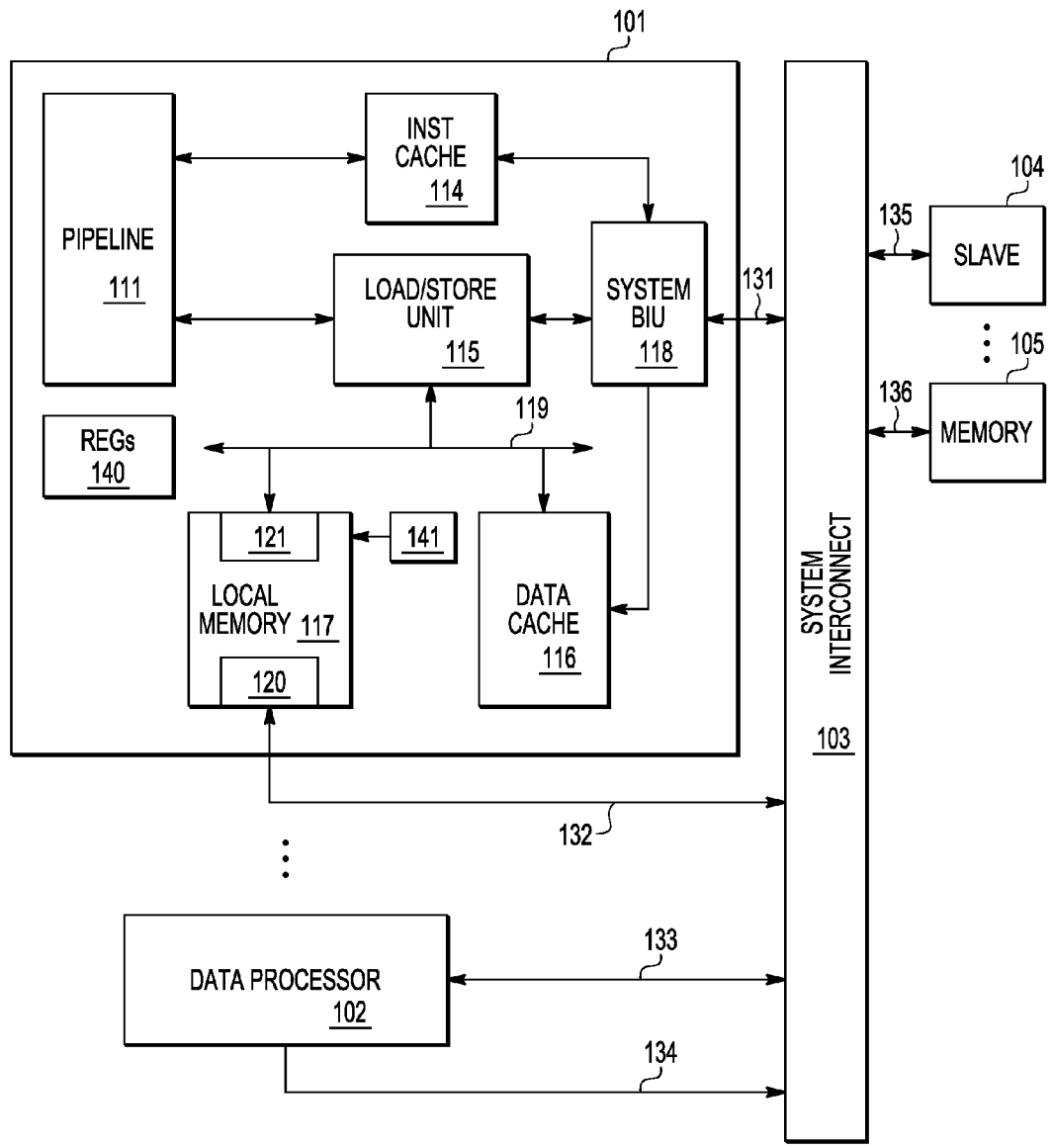
FIG. 1 is a block diagram illustrating a data processing system.

FIG. 1 illustrates a data processing system 100 that includes one or more data processor units 101-102, busses 131-136, a system interconnect 103, and one or more peripherals 104-105. Data processor units 101-102 may be any type of data processor, such as a central processing unit, a digital signal processor, a microcontroller, and the like. Peripheral 104 is illustrated to be a slave device that can be a memory or other peripheral that receives or provides information via the system interconnect 103. Peripheral 105 is illustrated to be a memory device, such as a volatile memory device or a non-volatile memory device, that receives or provides information via the system interconnect 103. One or more of the busses 131-136 connect each of the data processor units 101-102 and peripherals 104-105 to system interconnect 103. System interconnect 103 represents a cross-point switch, or other module, that facilitates communication of information amongst each of the data processor units 101-102 and peripherals 104-105.

Each of the illustrated elements of FIG. 1 can be part of a common semiconductor substrate, part of a common package, part of a common circuit board, the like, and combinations thereof. For example, memory 105 can include memory integrated at the same semiconductor substrate as data processor units 101-102 and as system interconnect 103, while other peripheral devices are not integrated at the same semiconductor substrate.

Each of the plurality of data processor units 101-102 can be of the same type or of different types. For purposes of discussion, it is assumed that each of the plurality of data processor units 101-102 is of the same type, as illustrated in greater detail by data processor unit 101. Data processor unit 101 includes an execution pipeline 111 that controls various processing functions associated with executing an instruction. These various functions can include: initiating instruction fetch requests; decoding fetched instructions; initiating data fetch requests; dispatching commands to at least one Arithmetic Logic Unit (ALU), such as an integer or floating point ALU, based upon decoded instructions; initiating data store request; and the like.

Pipeline 111 is connected to an instruction cache 114, a load/store unit 115, and to a set of registers 140. The pipeline 111 communicates with the load/store unit 115, which accesses instruction operands stored in memory based upon information provided by the pipeline 111, including operands stored in local data memory 117, and peripherals 104-105. The registers are user programmable, and can include address registers, data registers, a base address register 141, and the like. The pipeline 111 can access the set of registers 140 directly.

A local bus 119 is connected to the load/store unit 115, port 121 of the local data memory 117, and a data cache 116, each of which are local to data processor 101. A system bus interface unit (BIU) 118 of the data processor 101 includes a port connected to system interconnect 103 via bus 131, a port connected to the instruction cache 114, a port connected to the load/store unit 115, and a port connected to data cache 116. Local data memory 117 includes a port 120 that can be a slave Bus Interface Unit (BIU) that is connected to the system interconnect 103 via bus 132. According to one embodiment, local bus 119 is independent from the busses 131-136 that are connected to system interconnect 103, such that local bus 119 can transmit information between elements of data processor 101 simultaneously with at least one of busses 131 and 132 transmitting information between data processor 101 and another data processor, such as data processor 102, and peripherals 104-105 via interconnect 103, which is a resource shared with at least one other peripheral or data processor.

During operation of the data processing system 100, instruction fetch requests are provided from the pipeline 111 to the instruction cache 114. Instruction cache 114 will provide the requested instruction from a cache array if available, or will provide an access request for the needed instruction to the system BIU 118.

Instructions returned to the pipeline 111 from the instruction cache 114 can include information that indicates the location of one or more instruction operands, which are data operands used to perform an operation associated with the instruction. Instructions can identify an instruction operand having an effective address associated with an address map of the data processor unit 101, which can be the same or different as an address map of the data processing system 100. The effective address of an instruction operand stored in memory needs to be determined to access the instruction operands used to execute the current instruction. Alternatively, instruction operands can be stored at register locations that are directly accessible by the pipeline 111.

Depending upon a particular addressing mode associated with an instruction, one or more fields of the instruction are used to determine the effective address of an instruction operand stored in memory. For example, an effective address can be calculated from: a value stored at a single register identified by the instruction, which is referred to herein as register indirect addressing mode; by values stored at more than one register identified by the instruction, which is referred to herein as indexed register indirect addressing mode; by a displacement value provided as part of the instruction and added to another value identified by the instruction, which is referred to as displacement addressing mode; the like; and combinations thereof In response to decoding an instruction that has an instruction operand stored at a particular effective address, the pipeline 111 will provide a request to the load/store unit 115 that includes one or more values, referred to as effective address input operands. Examples of effective address input operands include: a displacement operand, which is a value based upon a displacement field of the instruction; a register indirect address operand, which is a value stored at a register identified by the current instruction; and the like.

The load/store unit 115 uses received effective address input operands to calculate an effective address of an instruction operand, the load/store unit then uses the effective address to generate a memory access request. Instruction operands retrieved by the load/store unit 115 are provided to the pipeline 111, which uses the operands to complete processing of the current instruction. Pipeline 111 also provides access requests to the load/store unit 115 in a similar manner to store results at a destination associated with an effective address. Operation of a particular embodiment of the present disclosure will be better understood with reference to FIGS. 2-7.

Figure 2:
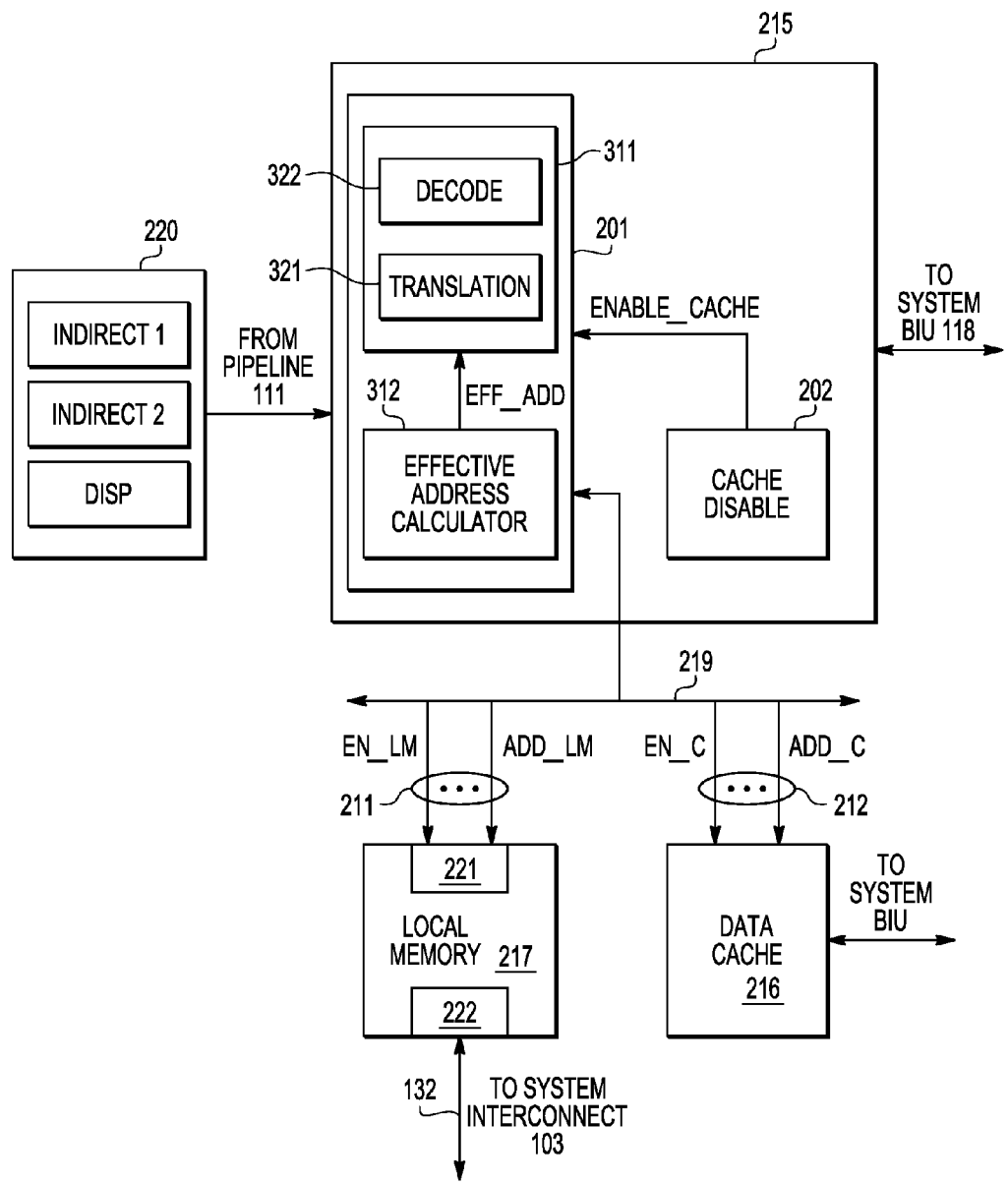
FIG. 2 is a block diagram of a particular embodiment of a portion of the data processing system of FIG. 1.

FIG. 2 illustrates a local memory 217, a data cache 216, a load/store unit 215, and a bus 219, each of which are specific implementations of their similarly numbered counterparts illustrated at FIG. 1. Bus 219 corresponds to local bus 119 of FIG. 1, and is illustrated to include portion 211 and portion 212. Portion 211 is that part of bus 219 that communicates control and address information between the load/store unit 215 and the local memory 217. Portion 212 is that part of bus 219 that communicates control and address information between load/store unit 215 and the data cache 216.

Also illustrated at FIG. 2 is instruction information 220, which represents effective address input information from the pipeline 111 that is used to determine the effective memory address of an instruction operand of the current instruction. For purposes of discussion, the instruction information 220 is illustrated to include effective address input information for a single instruction operand including: information labeled INDIRECT1, which corresponds to a register indirect address operand associated with a register, e.g., a value stored at a register identified by the current instruction; information labeled INDIRECT2, which corresponds to a register indirect address operand associated with another register identified by the instruction; and information labeled DISP, which corresponds to a displacement operand of the current instruction. One or more of the illustrated instruction information 220 values may be provided (or, alternatively, remain unused) for effective address calculation by load store unit 215 depending upon a particular addressing mode.

The calculated effective address will correspond to instruction operand values that are stored in local memory 217, or in a memory other than local memory 217, such as in memory 105. Instruction operands stored at local data memory 217 are accessed via a request sent from the load/store unit to local data memory 217 to one of the local memory ports 221 and 222. In one embodiment, instruction operands stored outside of local memory 217 are accessed via a request sent from the load/store unit to data cache 216. In response to a cache hit, data cache 216 will retrieve previously cached instruction operands from a cache memory array of the data cache 216, thus improving performance of data processor 101 by providing a low-latency response to access requests. If the non-local memory information is not stored at the cache memory array of data cache 216, the data cache 216 will provide an access request to the BIU 118 to retrieve the instruction operand. Note that Local memory 217 typically has a low-latency response time that is similar to, or better than, the response time of data cache 216 when a cache hit occurs. Thus, in one embodiment, data cache 216 does not cache information stored within the address space corresponding to local memory 217, since there would be no improvement in access latency, and in fact, caching information associated with local memory addresses would reduce the effective capacity of data cache 216. In an alternate embodiment, the load/store unit 215 can access external memory without using data cache 216.

The load store unit 215 includes an address calculator module 201 that determines access addresses that are provided to the local memory 217 and to the data cache 216 as part of respective access requests. The address calculator module 201 includes an effective address calculator 312 that determines an effective address of an instruction operand. For example, in one embodiment, the effective address of an instruction operand associated with a register indirect with displacement addressing mode is determined by summing INDIRECT1 and DISP of the instruction information 220. In another example, the effective address of an instruction operand associated with an indexed register indirect addressing mode is determined by summing INDIRECT1 and INDIRECT2 of the instruction information 220. In another embodiment, the effective address of an instruction operand associated with an indexed register indirect with displacement addressing mode is determined by summing INDIRECT1, INDIRECT2, and DISP of the instruction information 220.

Once calculated, the effective address can be further translated and decoded as necessary by the translation/decode module 311 in order to generate control signals, including EN_LM, and an access address (ADD_LM) that are provided to local memory 217, and in order to generate control signals, including EN_C and an access address (ADD_C) that are provided to data cache 216.

Based upon the effective address, the address calculator module 201 determines whether an instruction operand is stored in local memory 217, is stored in a memory that is accessed via data cache 216, or is associated with an invalid address. To access instruction operands from local memory 217, the address calculator 201 provides an access request to port 221 of the local memory 217 via local bus 219. To access instruction operands from non-local memory, the address calculator 201 provides an access request to the data cache 216 bus 219 or directly to the system BIU. An error indicator is generated if it is determined that an instruction operand is associated with an invalid address of the data processor unit 101.

Figure 3:
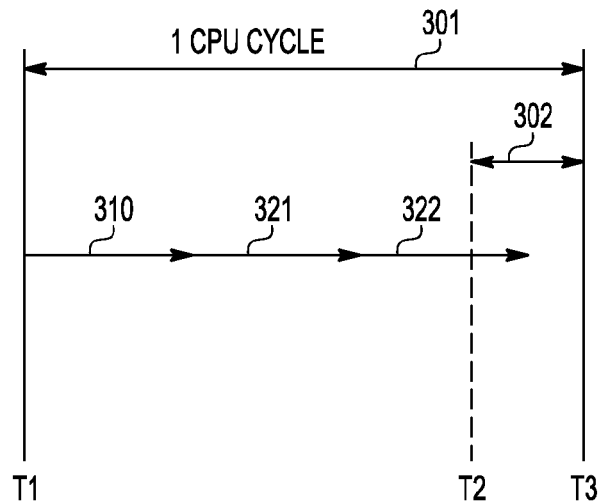
FIG. 3 illustrates a timing diagram in accordance with the present disclosure.

FIG. 3 illustrates a timing diagram for a current clock cycle of the data processor 101 having duration 301 that starts at T1 and ends at T3. The current clock cycle is an access set-up cycle of the load/store unit used to prepare data access requests. Duration 302 is the time from T2 to T3 and represents a data cache disable set-up time. The data cache disable set-up time represents the time prior to the start of the next clock cycle that the load/store unit 216 needs to prevent a data access that is being prepared for the data cache 216 from initiating during the next clock cycle. Durations 310, 321, and 322 represent propagation delays through various portions of the address calculator 201. The duration 310 is a duration associated with determining the effective address, which includes adding the effective address input operands. The duration 321 includes a duration associated with translating the effective address, if any, such as to a physical address from a logical address. The duration 322 represents a duration associated with decoding the effective address, or translated address, associated with an access request, such as EN_LM by 201 of FIG. 2. The sum of durations 310, 321, and 322 represents the duration, from time T1, needed by the address calculator module 201 to definitively determine an effective address is in local memory and stop a data cache access from occurring during the next clock cycle. Therefore, absent any other decode information, it will be necessary for the calculator 301 to generate control signals in the current clock cycle to initiate a cache access request at the beginning of the next clock cycle that is speculative, or to generate non-speculative requests to the data cache 216 by delaying generation of the control signals until the next clock cycle.

According to a specific embodiment of the present disclosure, the cache disable module 202 is capable of determining whether to disable access to the cache prior to the set-up time 302 for at least a portion of the set of possible combinations of instruction information 220. In other words, for certain instructions, the cache disable module 202 will be able to determine more quickly than does the address calculator 201 that the load/store module will access an instruction operand from local data memory 217, or that the effective address associated with the instruction operand is an invalid address. In response to determining a current set of instruction information is not to be accessed via the data cache 216, the disable module 202 deasserts the enable signal ENABLE_CACHE prior to time T2, thereby meeting the disable cache access set-up time 302.

For combinations of instruction information that do not definitively rule out accesses to data cache 216, the address calculator 201 will either speculatively issue a cache access request, or will insert a clock cycle prior to issuing the cache access request. Each of these options has the disadvantage of either increasing power consumption or the data access latency of the cache memory 216.

Instead of relying upon a delay path of the address calculator 201 that includes having to determine an effective address, a separate, faster, delay path through cache disable module 202 is used to disable the data cache 216. However, in a particular implementation, the cache disable module 202 can only rule out the occurrence of accesses to data cache 216 for certain portions of all possible combinations of instruction information 220. For example, it may be possible to rule out cache accesses for some values of INDIRECT1 but not for other values of INDIRECT1. The data cache enable module 202 will negate (deassert) signal ENABLE_CACHE once an access to the data cache 216 is ruled out, thereby allowing the address calculator to prevent initiation of an access cycle at cache 216 during the next clock cycle, thus conserving energy.

Operation of the cache disable module 202 will be described below with respect to a load instruction using register indirect addressing mode. In one embodiment the load instruction has the syntax "LD Dx,(d,Ay)." Dx is a destination register specifier identifying a specific data register where the destination instruction operand of the load instruction is stored. Ay is a source register specifier identifying a specific address register, d is a displacement operand, the parenthesis indicate that register indirect addressing mode is used to determine the effective address of a source instruction operand, wherein the value stored at the source register identified by specifier Ay is added to the displacement operand d to determine the effective address of a source instruction operand. Note that the term Dx, without parenthesis, indicates that direct addressing mode is being used for the destination operand of the instruction, wherein the source operand is stored directly into register Dx.

During operation, the pipeline 111 decodes the load instruction and provides the value stored at register Ay (INDIRECT1) and the displacement value d (DISP) to the load/store module 115. The address calculator 201 uses the values INDIRECT1 and DISP to determine an access address for an instruction operand being accessed. In particular, the effective address calculator 312 of the address calculator 201 includes a data path that adds INDIRECT1 and DISP together to determine an effective address (EFF_ADD). The effective address is provide to the translation/decode module 311 to perform translation, as needed, and decoding needed to provide accesses requests to data cache 216 and to local memory 217.

The address calculator 201 uses the value INDIRECT 1 to determine the effective address at the address calculator module 201 concurrently with the cache decode module 202 determining the state of ENABLE_CACHE based upon the value INDIRECT 1. For example, the durations during which the address calculator module 201 and the cache disable module 202 operate, respectively, overlap in time. In addition, the address calculator and the cache disable module are also parallel to each in that separate data paths are used to perform their respective decode operations In accordance with one embodiment, the address calculator 201 will provide an access request to the local memory 217 and will not provide an access request to data cache 216 in response to signal ENABLE_CACHE being deasserted, and will provide access requests to both local memory 217 and to data cache 216 in response to signal ENABLE_CACHE being asserted. In accordance with another embodiment, the address calculator 201 will provide an access request to the local memory 217 and will not provide an access request to data cache 216 in response to signal ENABLE_CACHE being deasserted, and will provide an access request to data cache 216 and will not provide an access request to local memory 217 in response to signal ENABLE_CACHE being deasserted.

According to a particular embodiment of the present disclosure, proper decoding of signal ENABLE_CACHE by the cache disable module 202 can rely upon load/store unit 115 recognizing a reserved address space that is adjacent to the memory space of the local memory 217 as described in greater detail below. This reserved address space is referred to herein as local memory reserved address space. The local memory reserved address space is a portion of the address map of the data processor unit 101 that is not valid. An invalid address indicator can be generated if an access to reserved address space is attempted.

Figure 4:
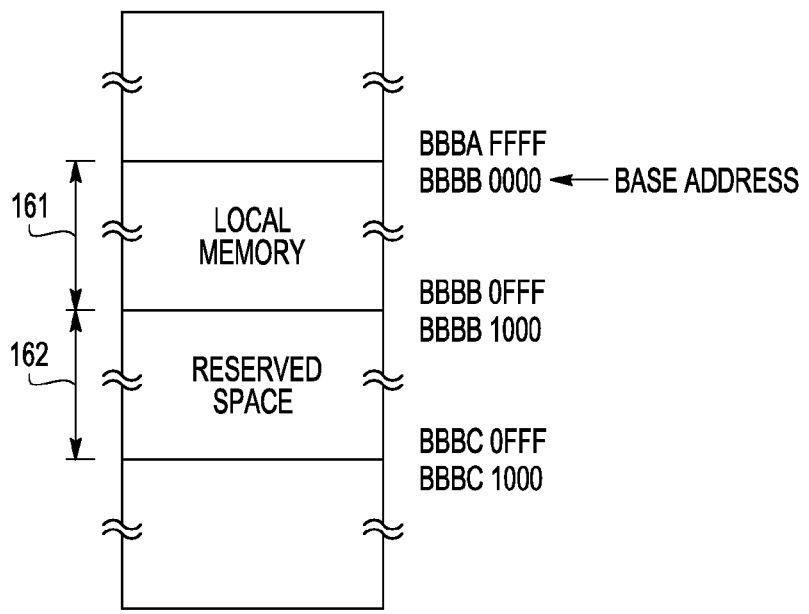
FIG. 4 illustrates a memory map in accordance with the present disclosure.

Referring to FIG. 4, the base address of a four kilo-byte (KB) local data memory 117 (LOCAL MEMORY) is BBBB0000h, where h indicates a hexadecimal number, as programmed in the base address register 141. Because twelve bits are needed to access a four KB range of memory, the local memory is said to have an "index size" of twelve, and uses a base address that is mapped to a 4 KB boundary, which is also referred to herein as a twelve bit boundary. For a 32-bit number, a twelve bit boundary is represented by a 32-bit values having zeros (0) for each of the least-significant 12 bits. The local memory of FIG. 4 is mapped to the address space 161 (BBBB0000h-BBBB0FFFh).

To facilitate the fast cache disable described herein, a local memory reserved address space 162 is defined to include all addresses that are reachable by a 16-bit displacement from any address within the local memory address space 161. For example, the address that is a distance FFFF from the first address of local memory (BBBB0000) is reserved, and the address that is a distance FFFF from the last address of local memory (BBBB0FFF) is also reserved. Therefore, the size and location of the local memory reserved address space 162 is determined based upon the base address value and the number of bits used to represent the range of possible displacement values for a displacement addressing mode, such as a register indirect access with displacement addressing mode.

For example, for a 16-bit unsigned displacement value, the sixteen unsigned bits represent a 64 KB address range. Therefore, selection of a base address of BBBB0000h results in the 4 KB local memory 217 being mapped to a local address space 161 and the local memory reserved address space 162 being mapped to memory range 162 BBBB1000h-BBBC0FFFh. By reserving address space 162, which includes all effective addresses that can be derived by adding a 16-bit displacement value to any address of the local memory 217, the cache disable module 202 can quickly rule out accesses to data cache 216 by a compare operation that determines if some or all of the most-significant bits of the base address value used to identify the 4 KB boundary of the local memory 217 are equal to a corresponding portion of the most-significant bits of the register indirect operand INDIRECT1. Equation 1 illustrates one comparison that can be used to determine whether to deassert the signal EN_C.

IF (rA[0:19] EQ BASE_ADDRESS[0:19])

THEN disable EN_C; Equation 1 where:
rA[0:19] refers to the 20 most-significant bits of the value stored at register rA, where 0 is the most-significant bit and 19 is determined by the data bit size (32) less the local memory index size (12) less one (1);
BASE_ADDRESS[0:19] refers to the 20 most-significant bits of the base address value that correspond to the 20 most-significant bits of rA;

Note that in other embodiments, fewer than all of the most significant bits of the base address that define the 4 KB boundary can be compared to a corresponding portion of INDIRECT1. While doing so will result in a larger local memory reserved space, it can also result in more efficient decoding by the load/store unit 215. Similarly, the local memory reserved space can be determined using more bits than the 16-bits needed to represent a 64 KB displacement value to facilitate more efficient decoding by the load/store unit 215.

Figure 5:
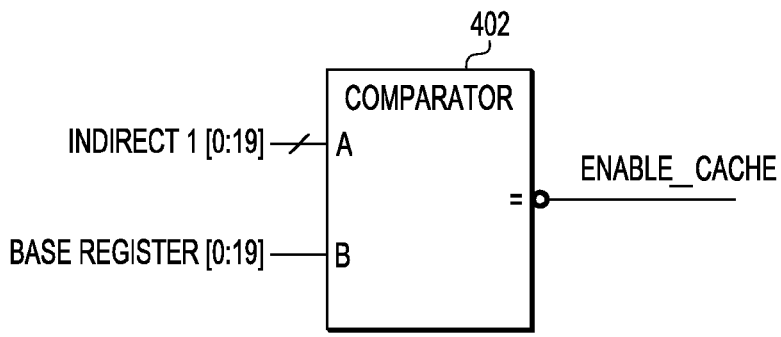
FIG. 5 illustrates a block diagram of a portion of the block diagram of FIG. 2 in accordance with a particular embodiment.

FIG. 5 illustrates a comparator 402 that that implements Equation 1 and corresponds to a particular embodiment of the cache disable module 202 of FIG. 2. The comparator 402 includes an input that receives the most-significant 16-bits of the INDIRECT1 information, an input that receives a corresponding 16-bits of the base address, and an output that provides an asserted signal when the values at the two inputs match. An asserted output signal of the comparator 402 can provide a logic-level zero that corresponds to a negated enable signal (EN_C) being provided to the enable input of the data cache 216.

In another embodiment, fewer than all of the most significant bits of the base address that define the 64 KB range of the local memory 217 and the local memory reserved address space can be used in Equation 1, e.g., fewer than 16-bits in the present example. While using fewer bits will result in reducing the amount of available memory space in the effective address memory map by increasing the size of the local memory reserved address space, doing so can also facilitate a comparison that requires less logic and can result in a faster decode of the data cache enable signal (EN_C).

In an alternate embodiment, the displacement value of the instruction can be a sixteen-bit signed value having a data size of 15-bits along with one sign bit. To facilitate the fast cache disable described herein, a reserved address space is defined to include all addresses that are reachable by a 15-bit negative displacement from any address within the local memory address range and to include all addresses that are reachable by a 15-bit positive displacement from any address within the local memory address range. For example, the address that is a distance 7FFF below from the first address of local memory (BBBB0000) is reserved, and the address that is a distance 7FFF above the last address of local memory (BBBB0FFF) is also reserved, as illustrated in FIG. 6.

Figure 6:
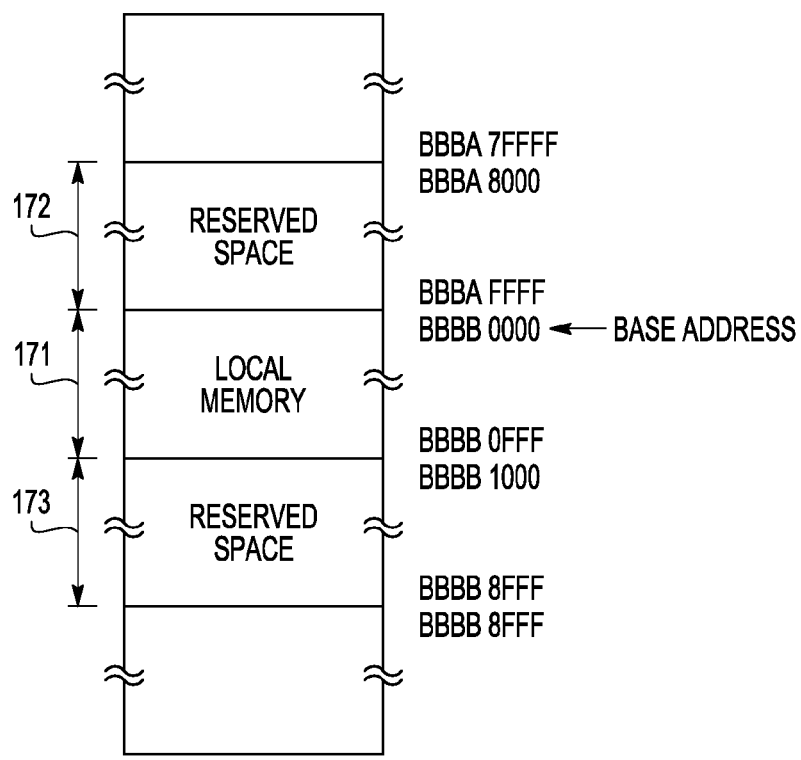
FIG. 6 illustrates a memory map in accordance with the present disclosure.

FIG. 6 illustrates the location of a base address BBBB0000h that results in the 4 KB local memory having an address space 171 of BBBB0000h-BBBB0FFFh. When a register indirect address operand, such as (Ay), of the load instruction, is equal to the base address BBBB0000h, e.g., the smallest local memory 217 address, the 16-bit signed displacement value of the instruction can result in calculating an effective address in the range BBBA8000h-BBBB7FFFh. When a register indirect address operand, such as (Ay), of the load instruction, is equal to the largest local memory 217 address BBBB0FFFh, the 16-bit signed displacement value of the instruction can result in calculating an effective address in the range BBBB0FFFh-BBBB8FFEh. Therefore, in order to facilitate the fast cache enable decode described herein, two local memory reserved address spaces need to be maintained. A first local memory reserved address space 172 is defined by address range BBBA8000h-BBBAFFFFh, and a second local memory reserved address space 173 is defined by address range BBBB1000h-BBBB8FFEh.

By providing for local memory reserve address spaces 171 and 172, Equation 1 continues to represent the operation of the cache disable module 202 when decoding an instruction using indirect register addressing with a signed displacement.

Operation of the cache disable decode module 202 will be described below with respect to a load instruction that uses indexed address indirect addressing mode. In one embodiment the load instruction has the syntax "LD Dx,(Ay,Xi)." Dx is a destination register specifier identifying a specific data register where the destination instruction operand will be stored. Ay is a first source register specifier identifying a specific address register, Xi is a second source register specifier identifying a specific register such as a dedicated index register or any address or data register, d is a displacement operand, the parenthesis indicate that indexed register indirect address mode is used to determine the effective address of a source instruction operand, wherein the effective address of a source instruction operand is determined by adding the value stored at the first source register (Ay) to the value stored at the second source register (Xi). Note that the term Dx, without parenthesis, indicates that direct addressing mode is being used for the destination operand of the instruction, wherein the source operand is stored directly into register Dx.

Figure 7:
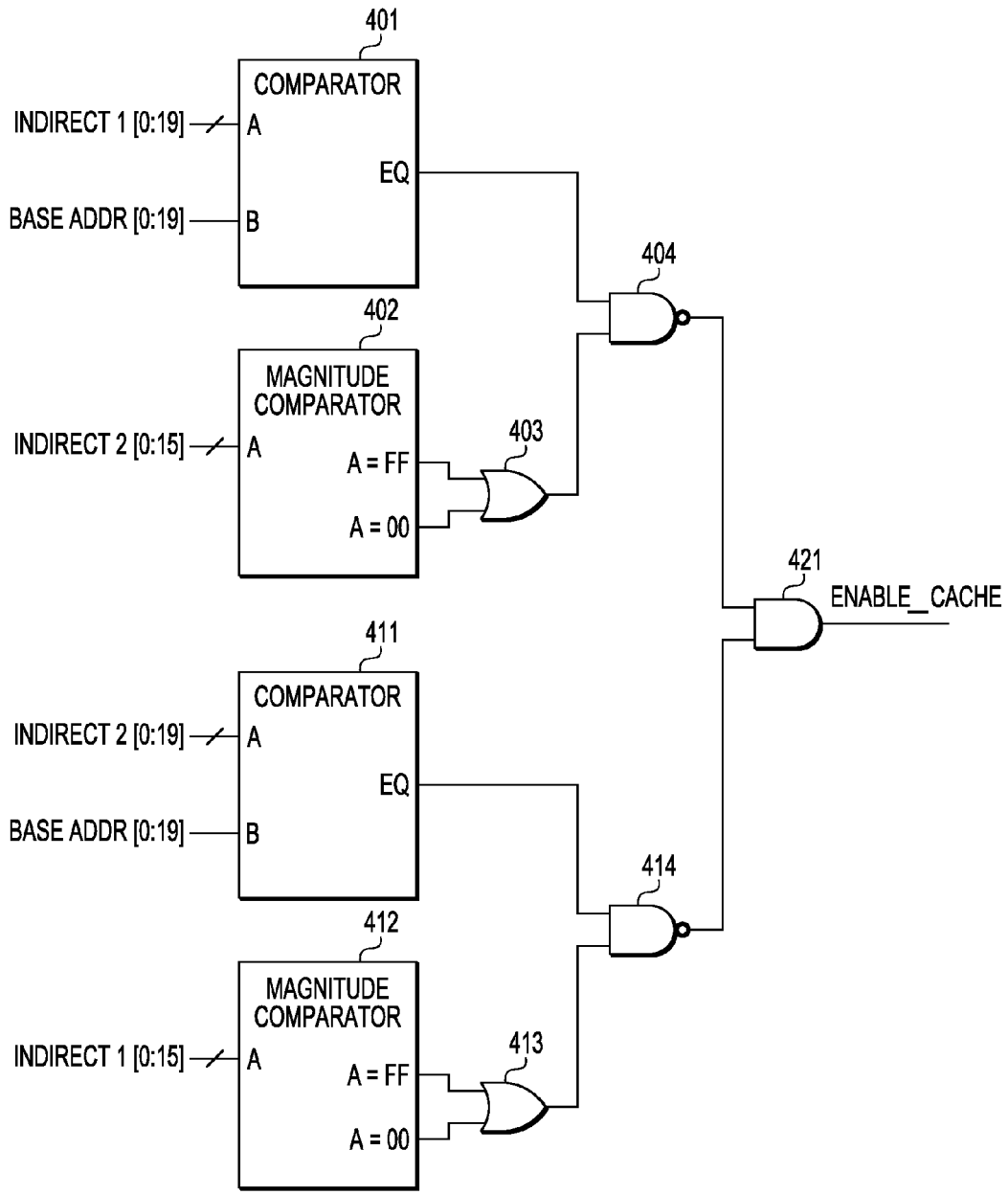
FIG. 7 illustrates a block diagram of a portion of the block diagram of FIG. 2 in accordance with a particular embodiment.

FIG. 7 illustrates an implementation of the cache disable module 202 that is capable of performing a fast decode that can determine for a portion of the set of possible combinations of instruction information that a cache access is not needed for an indexed register indirect addressing mode. FIG. 7 includes comparators 401, 402, 411, and 421, and logic gates 403, 404, 413, 414, and 421. Comparator 401 has a first input, a second input, and an output. The first input of the comparator 401 receives the 20 most significant bits of a value INDIRECT1, which is stored at a first register location. The second input of the comparator 401 receives the 20 most significant bits of a value BASE_ADDR, which is the value stored at the base address register. The output of the comparator 401 is asserted to a logical one when the values at the first and second inputs are equal, and is negated to a logical zero when the values at the first and second inputs are not equal.

Comparator 402 has a first input, a first output, and a second output. The first input of the comparator 402 receives the 16 most significant bits of value INDIRECT2, which is stored at a second register location. The first output of the comparator 402 is asserted to a logical one when each of the bits received at the first input are equal to one, which indicates the 16-bit value INDIRECT2[16:31] is a negative value with a magnitude less than or equal to $2^{15}$. The second output of the comparator 402 is asserted to a logical one when each of the bits received at the first input are equal to zero, which indicates the 16-bit value INDIRECT2[16:31] is a positive value with a magnitude less than $2^{15}$. A NOR gate 403 includes a first input connected to the first output of the comparator 402, a second input connected to the second output of the comparator 402, and an output that is asserted to a logical one in response to either the first or second output of comparator 402 being asserted. A NAND gate 404 has a first input connected to the output of comparator 401, a second input connected to the output of NOR gate 403, and an output that is asserted to a logic zero in response to the first and second inputs receiving asserted signals (logic ones).

Comparator 411 has a first input, a second input, and an output. The first input of the comparator 411 receives the 20 most significant bits of a value INDIRECT2, which is stored at the second register location. The second input of the comparator 411 receives the 20 most significant bits of a value BASE_ADDR. The output of the comparator 411 is asserted to a logical one when the values at the first and second inputs are equal, and is negated to a logical zero when the values at the first and second inputs are not equal.

Comparator 412 has a first input, a first output, and a second output. The first input of the comparator 412 receives the 16 most significant bits of value INDIRECT1, which is stored at a second register location. The first output of the comparator 412 is asserted to a logical one when each of the bits received at the first input are equal to one, which indicates the 16-bit value INDIRECT1[16:31] is a negative value with a magnitude less than or equal to $2^{15}$. The second output of the comparator 412 is asserted to a logical one when each of the bits received at the first input is equal to logical zero, which indicates the 16-bit value INDIRECT1[16:31] is a positive value with a magnitude less than $2^{15}$. A NOR gate 413 includes a first input connected to the first output of the comparator 412, a second input connected to the second output of the comparator 412, and an output that is asserted to a logical one in response to either the first or second output of comparator 412 being asserted. A NAND gate 414 has a first input connected to the output of comparator 411, a second input connected to the output of NOR gate 413, and an output that is asserted to a logic zero in response to the first and second inputs receiving asserted signals (logic ones).

A NAND gate 421 includes a first input connected to the output of the NAND gate 404, a second input connected to the output of the NAND gate 414, and an output to assert a signal labeled ENABLE_CACHE to a logic one to enable a cache access request, and to negate the signal labeled ENABLE_CACHE to a logic zero to disable a cache access request.

In operation, the signal ENABLE_CACHE will be negated in response to one of the specified registers, Ay (INDIRECT1) or Xi (INDIRECT2), storing a value that is in the local memory address range (BBBB0000h-BBBB0FFFh) and the other of the two specified registers having a value in a predefined range. For purposes of discussion, the predefined range of the second value is selected based upon a signed 16-bit value, and therefore is a value in the range of $+/-2^{15}$. Assuming Ay and Xi are 32-bit values, Equation 2 can be used to implement the fast decode when the 4 KB local memory 217 is placed on a 4 KB boundary of the memory map. In this example, if one of the values stored at registers Ai or Xi is a local memory address, and the other value has a magnitude within the range being detected by the magnitude comparators in FIG. 7, then the final calculated effective address will fall within the memory map allocated to the local memory 117 and the reserved space defined by address spaces 171 and 172 of FIG. 6, and the ENABLE CACHE signal is negated to disable a cache access.

IF (((Ay[0:19] EQ BASE_ADDRESS[0:19])

AND ((Xi[0:15] EQ FFFFh) OR (Xi[0:15] EQ 0000h)))

OR ((Xi[0:19] EQ BASE_ADDRESS[0:19])

AND ((Ay[0:15] EQ FFFFh) OR (Ay[0:15] EQ 0000h))))

THEN disable EN C, where:    Equation 2

[0:19] represents the most-significant 20 bits of the indicated register Ay or Xi, and corresponds to those bits identifying a 4 KB boundary of a 32-bit address map; and

[0:15] represents the most-significant 16 bits of the indicated register Ay or Xi, where each of the most significant 16-bits will be a zero if the value at the indicated register has a decimal value from 0 to $2^{15}-1$, and each of the most significant 16-bits will be a one if the value at the indicated register has a decimal value from $-1$ to $-2^{15}$.

Note that in other embodiments, fewer than all of the most significant bits of the base address that define the 4 KB boundary can be compared to a corresponding portion of register Ay or Xi, which will result in a larger local memory reserved address space.

Figure 8:
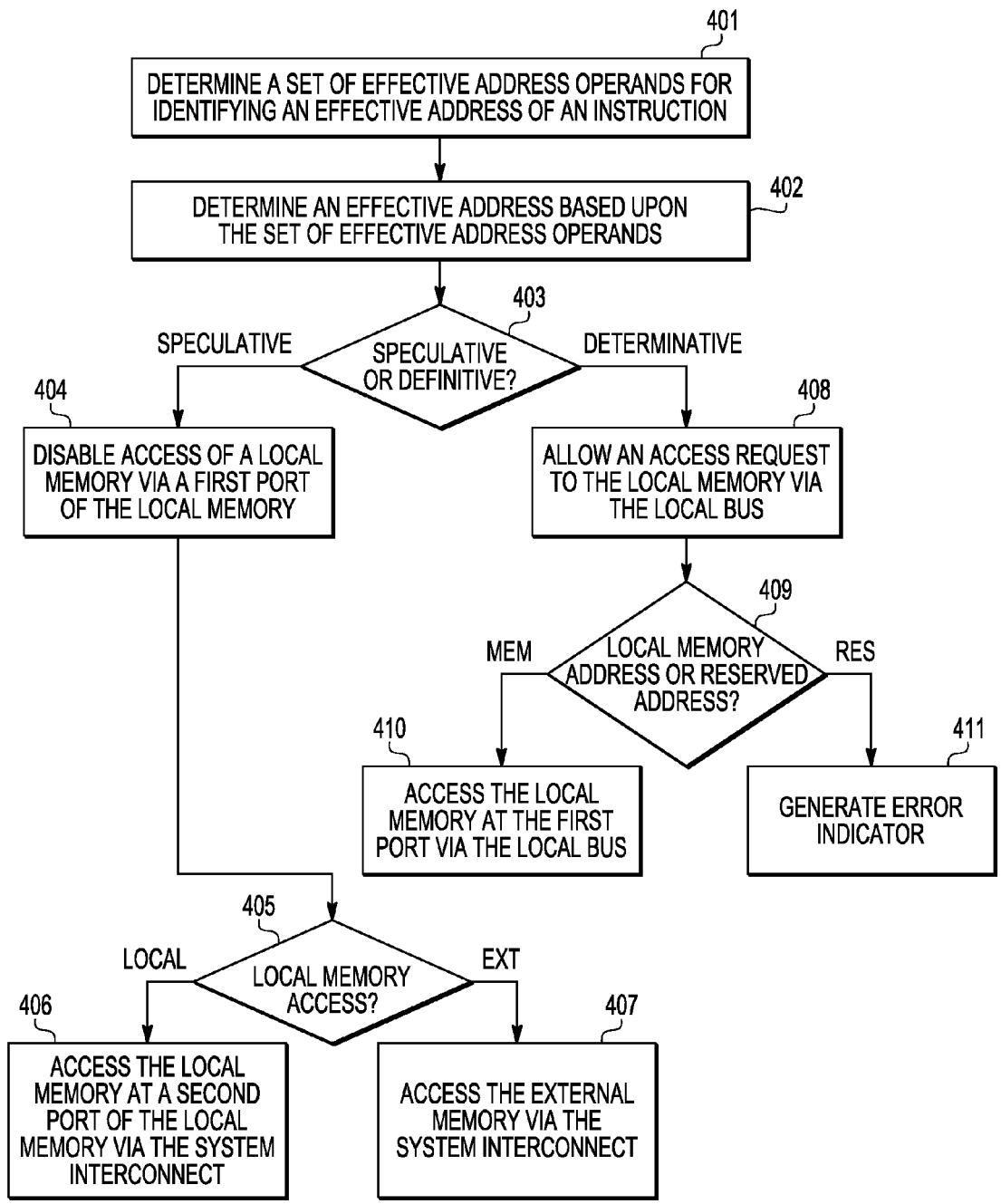
FIG. 8 illustrates a flow diagram in accordance with a particular embodiment of the present disclosure.

FIG. 8 illustrates a method in accordance with a particular embodiment of the present disclosure, and will be discussed with reference to the FIGS. 1-7. At node 401 of FIG. 8, a set of effective address input operands are determined. The effective address input operands are used to identify an effective address of an instruction operand for a current instruction. For example, the execution pipeline 111 of FIG. 1 provides instruction information 220, which is one possible combination of a set of possible effective address input operands.

At node 402, an effective address is determined based upon the set of effective address input operands. For example, to determine an effective address using register indirect with displacement addressing mode, the set of effective address input operands will include a value from an identified register and a displacement value, which are added together in order to determine the effective address.

At node 403, it is determined whether an access request for the instruction operand of the current instruction will be a speculative request, or a definitive request. In particular, it will be determined at node 403 whether or not it is definitive that the effective address being calculated at node 402 is in a first address range of address space for the data processor unit, or if it is speculative that the effective address being calculated at node 402 will be in a first address range. For example, an access to local memory is speculative if it is possible the effective address is not an address of the local memory. For example, referring to FIG. 2, determining whether or not a particular effective address is definitively in a memory range that includes the local memory is determined by the cache disable module 202 as described previously. Note that the address calculator 201 determines the effective address of the current operand in parallel with cache disable module determining whether the effective address will definitively be in the first address range once determined, and therefore, the determination of node 403 occurs concurrently with the determination of 402.

In response to determining that it is speculative that the effective address is part of the first address range of the data processor unit, flow proceeds to node 404. Alternatively, if it is determined definitively that the effective address is in the first address range of the data processor, flow proceeds to node 408.

At node 404, data accesses to a local memory via a first port of the local memory will be disabled responsive to determining that it is speculative that the effective address is part of the first address range. Thus, access requests for the instruction operand of the current instruction will not be initiated at port 221 of local memory 217 by the load store unit 215.

At node 405 it is determined whether the effective address is in the first address range (LOCAL) or is an address of an external memory (EXT). In response to determining the effective address is in the first address range, flow proceeds to node 406. Alternatively, if it is determined that the effective address is in external memory flow will proceed to 407.

At node 406, in response to determining a instruction operand is in local memory, an access request will be provided to an external port of the local memory via a system interconnect. For example, an access request is provided to port 122 of the local memory via interconnect 103.

At node 407, in response to determining an instruction operand is in external memory, an access request will be provided to the external memory via a system interconnect.

Referring back to node 408, data accesses to a local memory via a first port of the local memory are allowed responsive to determining that it is definitive that the effective address will be part of the first address range.

At node 409, it is determined, based upon the effective address of 402 that the effective address corresponds to local memory 217, whereby flow proceeds to 410, or that the effective address corresponds to a reserved space in the first range whereby flow proceeds to 411.

At node 410, an access request to the local memory is made at port 121. For example, referring to FIG. 1, the load store unit 115 provides an access request to local bus 119 which is received at port 121 of local memory 117. Accessing information from local memory 117 occurs faster than accessing local memory 117 information via the system interconnect 103, which is external to the data processor 101.

At node 411, in response to determining the effective address is in a reserved space of the local memory, an error indication is provided.

Figure 9:
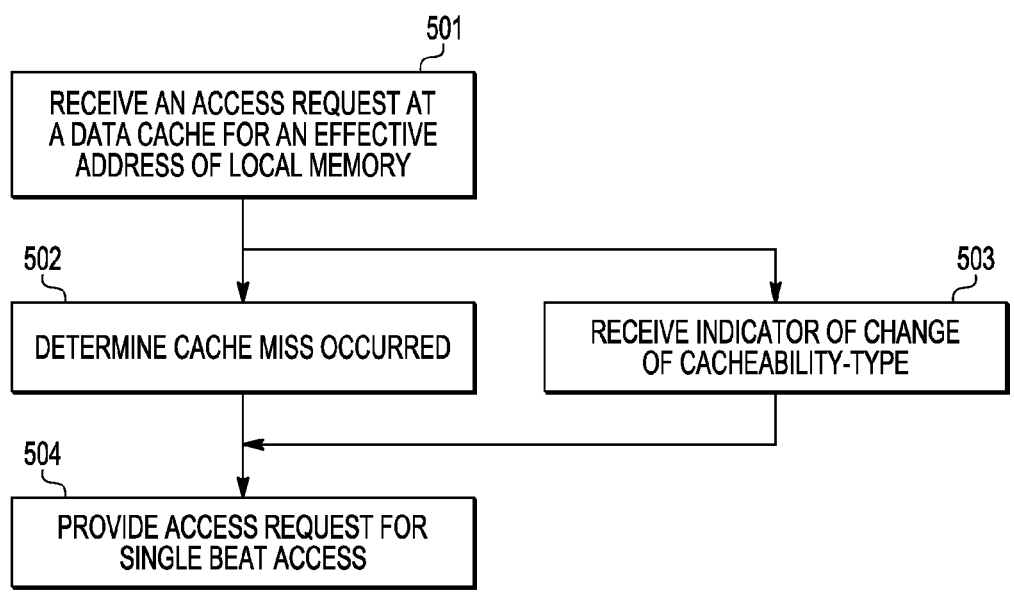
FIG. 9 illustrates a flow diagram in accordance with a particular embodiment of the present disclosure.

Operation of the data cache during operation will be better understood with reference to the method of FIG. 9, which includes nodes 501-504.

At node 501, it has been determined that an effective address is an address of local memory 117. However, it has also been determined at the load store unit 115 that access requests to port 121 of local memory 117 have been disabled. Therefore, the load store unit 115 will access local memory 117 at port 120 using a data path that is external to the data processor 101. Instead of submitting the request directly to the system bus interface unit 118 for servicing, the load store unit 115 provides a data access request to the data cache 116.

At node 502, it is determined at the data cache 116 that the effective address of the received request results in a cache miss. Note that because the access latency of the local memory 117 is typically no slower than the access latency of the data cache 116, local memory addresses are not cached in data cache 116 in accordance with a specific embodiment of the disclosure.

At node 503, an indicator is received at the data cache that changes the cacheability-type of the data being accessed from cacheable to non-cacheable. In other words, the cacheability-type of the access request being processed by the data cache 116 is been changed from cacheable to non-cacheable after initiation of the data access request at the data cache 116. The cacheability indicator may be provided in one embodiment by determining that the final calculated effective address corresponds to the local memory address space. That is, after completion of the actual calculation of the effective address, a comparison of the effective address to the address range of the local memory indicates a match. This cacheability indicator can arrive after the cache lookup for the effective address has begun, since it will not be needed until after the cache access has completed and cache hit determination is being made.

At node 504, responsive to the cacheability-type being changed to non-cacheable, the data cache 116 provides an access request to the system bus interface unit 118 that is a single beat access request. The term "single beat access request" refers to a request that uses the fewest number of accesses needed to retrieve the request information, as well as to avoid loading a cache line with multiple beats of data. Typically, a single beat access request would result in transmitting the requested information during a single clock cycle. Conversely, a multi beat access request uses additional clock cycles to retrieve information that was not requested by a source, such as when multiple clock cycles are used to transfer information in order to fill a cache line of the data cache.

Figure 10:
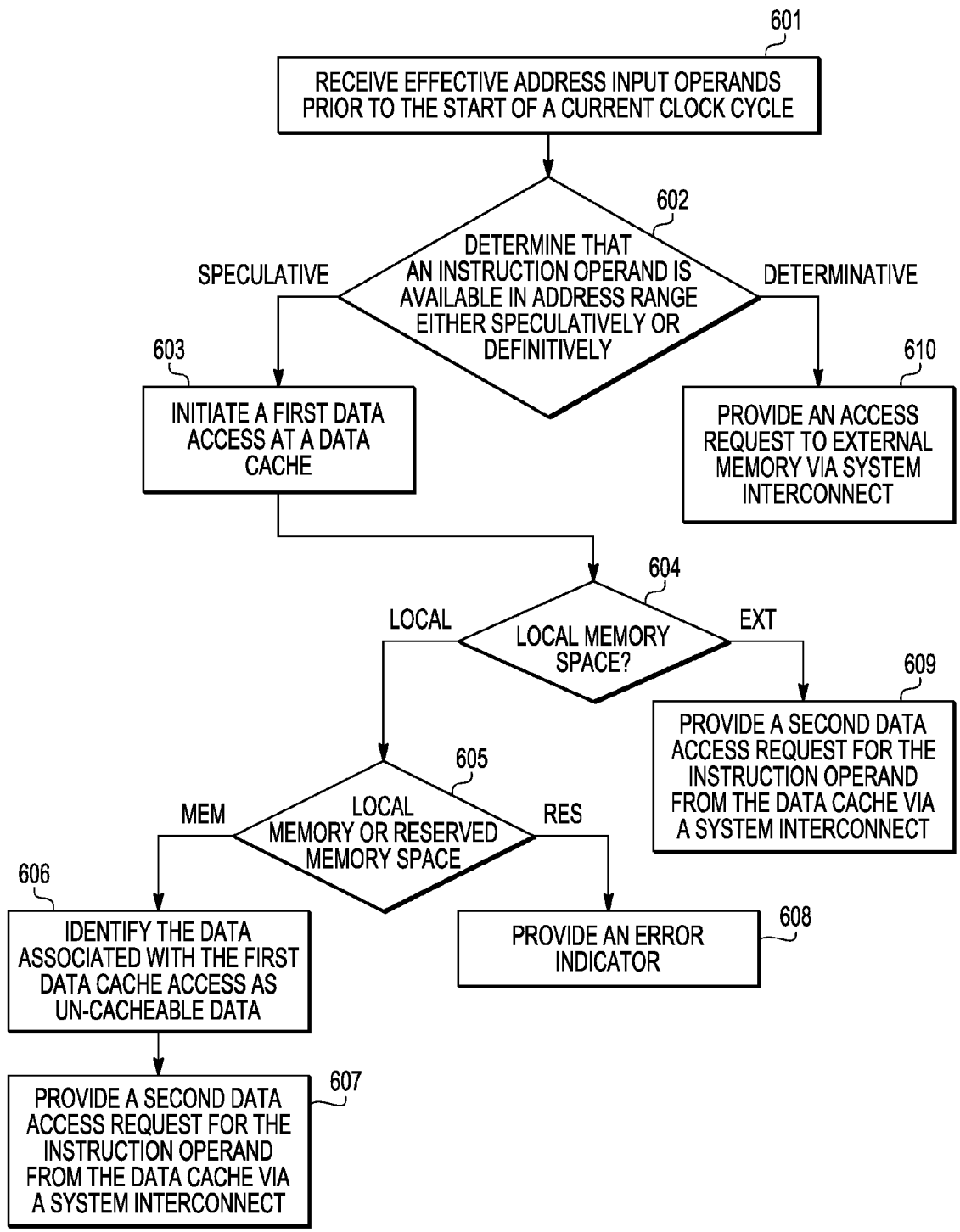
FIG. 10 illustrates a flow diagram in accordance with a particular embodiment of the present disclosure.

FIG. 10 illustrates a flow diagram in accordance particular embodiment of the present disclosure. At node 601, prior to the start of a current clock cycle, effective address input operands are received. The effective address input operands represent information based upon a current instruction being executed, and are used to calculate an effective address of an instruction operand.

At node 602, it is determined either speculatively that an instruction operand is available in an address range that includes a first memory, or it is determined definitively that the instruction operand is available in the address range.

In response to determining an access to local memory to retrieve the instruction operand is speculative, flow proceeds to node 603. In response to determining an access to local memory to retrieve the instruction operand is definitive, flow proceeds to node 610.

At node 603, the first data cache access is initiated in response to speculating that the information is available in the address range, whereby the information may or may not be in the address range. Note that an access to the local memory is not initiated in response to speculating that the information is available at the local memory.

At node 604, after initiation of the first data cache access request at 603, it is determined whether the effective address of the instruction operand is in the local memory space (LOCAL) or not in the local memory space (EXT). For example, referring to FIG. 2, the address calculator 201 will definitively determine the actual instruction operand being accessed in parallel with operation of the cache disable module 202. In response to determining the instruction operand is stored in local memory space, flow proceeds to node 605. In response to determining the instruction operand is not in local memory space, flow proceeds to 609.

At node 605, it is determined whether within the local memory space the effective address is associated with the local memory (MEM), or with a reserved space (RES). In response to the instruction operand being stored in local memory, flow proceeds to 606, otherwise, if the effective address of the instruction operand is associated with reserved space, flow proceeds to 608.

At node 606, an indication is sent to the data cache that the data cache access initiated at 603 is an un-cacheable data access. As an un-cacheable data access, the data retrieved as a result of a request from the data cache will not be stored in the cache array of the data cache. Note that in one embodiment, identifying the cache access as un-cacheable includes changing an indication that the cache access was originally cacheable.

At node 607, in response to a cache miss at the data cache indicating the instruction operand is not stored in a cache array, the data cache will provide a second data access request for the instruction operand that will result in an access being transmitted via the system interconnect to a second access port of the local memory.

At node 608, in response to determining at node 605 that the effective address of the instruction operand is in reserved space, an error indicator will be generated. For example, the load store unit 115 can generate an error indicator for exception processing.

Referring back to node 604, in response to determining an instruction operand is not in the local memory space, for example is in external memory space, flow proceeds to node 609. At node 609, the data cache will retrieve the instruction operand from the cache array, or generate a second data access request that will result in the information being accessed from external memory via the system interconnect 103.

Referring back to node 602, if it definitively determined that a set of effective address input operands corresponds to an effective address that will be in local memory space, flow proceeds to node 610. At node 610, a data access is provided to the first port of the local memory which is connected to a local bus of the data processor 101.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed.

Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

For example, in an embodiment, the techniques described above can be used with other addressing modes. For example, a technique similar to that described at Equation 2 can be used with an instruction that uses an indexed register indirect with displacement addressing mode provided the displacement value is zero. In addition, it will be appreciated that other variations can be implemented, for example, one of the registers being used during an indexed register indirect access mode, such as register Xi described above, can be a register location identified by the instruction opcode, such as a dedicated index register, or by information at a variable operand field of the instruction, while the other register is identified by information at a variable field of the instruction.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The is claimed is:

1. A method comprising:
    determining, based upon an instruction being decoded, a set of effective address operands for identifying an effective address of an instruction operand;
    determining, at a first portion of the data processor unit, an effective address based upon the set of effective address operands;
    determining based upon at least a portion of the effective address operands, at a second portion of a data processor unit, that it is either speculative that the effective address is in a first address range than includes a local memory of the data processor unit or that it is definitive that the effective address is part of the first address range; and
    disabling access of the local memory via a first port of the local memory in response to determining that it is speculative that the effective address is in the first address range.

2. The method of claim 1, wherein it is determined that the effective address is definitively determined to be in the first address range in response determining that a most-significant-bit portion of a value stored at a register is equal to a corresponding portion of the of a value stored at a base address register that is used to determine an address range of the local memory, wherein the at least a portion of the effective address operands includes the value stored at the register.

3. The method of claim 1 wherein disabling further comprises disabling access of the local memory via a local bus coupled to the first port, the local bus being local to the data processor unit and coupled to the first port of the local memory.

4. The method of claim 3 further comprising:
    allowing an access request to the local memory via the local bus in response to determining that it is definitive that the effective address is part of the first address range.

5. The method of claim 4 further comprising:
    determining whether the effective address is a local memory address or an external memory address; and
    subsequent to allowing the access request to the local memory, and in response to determining the effective address is an address of the local memory, accessing the local memory via the local bus.

6. The method of claim 1 further comprising:
    determining whether the effective address is a local memory address or an external memory address; and
    subsequent to disabling access of the local memory and in response to determining the effective address is an address of the local memory, accessing the local memory via a second port of the local memory.

7. The method of claim 6, wherein accessing the local memory via the second port includes accessing the local memory via a system interconnect coupled to the second port, the system interconnect not being local to the data processor.

8. The method of claim 7 further comprising:
    subsequent to disabling access of the local memory, and in response to determining the effective address is an address of the external memory, accessing the external memory via the system interconnect.

9. The method of claim 8, wherein accessing the external memory via the system interconnect includes accessing the external memory via a bus interface unit of the data processor unit that is coupled to the system interconnect, and wherein the system interconnect comprises a cross-point switch.

10. The method of claim 6, wherein accessing the local memory via the second port includes accessing the local memory via a system interconnect coupled to the second port, the system interconnect not being local to the data processor; and wherein disabling access of the local memory via the first port further comprises disabling access of the local memory via a local bus connected to the first port, the local bus being local to the data processor unit and coupled to the first port of the local memory.

11. The method of claim 6, wherein accessing the local memory via the second port further comprises providing an access request from a data cache of the data processor unit to access the local memory via the second port.

12. The method of claim 11, wherein the access request from the data cache is provided in response to a cache miss at the data cache.

13. The method of claim 11, wherein providing the access request from the data cache further comprises the access request from the data cache is for a single-beat access request in response to the access request received at the data cache being identified as un-cacheable.

14. A data processor unit comprising:
    a local memory of the data processor unit comprising a first port, a second port, and a first storage location associated with a first effective address of the data processor unit;
    a memory access module comprising:
        a first portion to determine an effective address of an instruction operand based upon a set of effective address operands received from an instruction execution pipeline,
        a second portion to determine concurrently with the first portion that it is either speculative that the effective address is in a first address range that includes the local memory of the data processor unit or that it is definitive that the effective address is part of the first address range, and
    the memory access module to disable access of the local memory via the first port in response to the second portion determining that it is speculative that the effective address is in the first range.

15. The data processor of claim 14 further comprising:
    a local bus local of the data processor unit coupled to the first port to provide access to the local memory; and
    a system interconnect not local to the data processor coupled to the second port to provide access to the local memory.

16. The data processor of claim 14, wherein the first portion further determines whether the effective address is a local memory address, or an external memory access, and subsequent to disabling access of the local memory via the first port due to the effective address being speculative, the first portion generates a first access request to access the local memory via the second port.

17. The data processor of claim 16 further comprising:
    a data cache coupled to a memory decode module to receive the first access request and to provide a second access request to access the local memory.

18. A method comprising:
- initiating a first data cache access at a data cache in response to speculating that an instruction operand of a current instruction will not be available in a first memory; and
- responsive to determining that the instruction operand is available in the first memory, identifying the data associated with the first data cache access as un-cachable data subsequent to initiating the first data cache access.

19. The method of claim 18, wherein the current instruction is being executed at processor pipeline of a data processor, and the first memory is a local memory of the data processor.

20. The method of claim 19, further comprising:
- providing, based upon the first data cache access, a second data access request from the data cache for the instruction operand via a second access port of the local memory via a system interconnect that is not a local bus of the data processor.

* * * * *